(12) United States Patent
Akari et al.

(10) Patent No.: US 12,105,320 B2
(45) Date of Patent: Oct. 1, 2024

(54) PLASTIC WAVELENGTH SHIFTING FIBER

(71) Applicant: KURARAY CO., LTD., Okayama (JP)

(72) Inventors: Masashi Akari, Niigata (JP); Katsuhiro Fujita, Niigata (JP); Ryuichi Iwakawa, Niigata (JP)

(73) Assignee: KURARAY CO., LTD., Okayama (JP)

(*) Notice: Subject to any disclaimer, the term of this patent is extended or adjusted under 35 U.S.C. 154(b) by 250 days.

(21) Appl. No.: 17/630,686

(22) PCT Filed: Jul. 29, 2020

(86) PCT No.: PCT/JP2020/029155
§ 371 (c)(1),
(2) Date: Jan. 27, 2022

(87) PCT Pub. No.: WO2021/020478
PCT Pub. Date: Feb. 4, 2021

(65) Prior Publication Data
US 2022/0260774 A1    Aug. 18, 2022

(30) Foreign Application Priority Data
Jul. 30, 2019  (JP) .................. 2019-139408

(51) Int. Cl.
*G02B 6/02* (2006.01)
*C09K 11/06* (2006.01)
*G01T 1/20* (2006.01)

(52) U.S. Cl.
CPC .......... *G02B 6/02033* (2013.01); *C09K 11/06* (2013.01); *G01T 1/2018* (2013.01); *C09K 2211/1018* (2013.01)

(58) Field of Classification Search
CPC ............ C09K 11/06; C09K 2211/1018; G02B 6/02033; G01T 1/2018
See application file for complete search history.

(56) References Cited

U.S. PATENT DOCUMENTS

| | | |
|---|---|---|
| 5,579,429 A | 11/1996 | Naum |
| 5,606,638 A | 2/1997 | Tymianski et al. |

(Continued)

FOREIGN PATENT DOCUMENTS

| | | |
|---|---|---|
| JP | 2002-116327 A | 4/2002 |
| JP | 2003-248061 A | 9/2003 |

(Continued)

OTHER PUBLICATIONS

Joram, C., "The new Fibre Tracker for LHCb", PH Detector Seminar, May 23, 2014, 70 slides.

(Continued)

*Primary Examiner* — Tina M Wong
(74) *Attorney, Agent, or Firm* — GREENBLUM & BERNSTEIN P.L.C.

(57) ABSTRACT

A plastic wavelength shifting fiber includes a core containing a fluorescent agent having a peak of a fluorescence spectrum in a wavelength range of 450 to 550 nm, and a cladding covering an outer peripheral surface of the core and has a refractive index lower than that of the core. A sum of the number of carbon and oxygen atoms of the fluorescent agent is 10 to 25, and a quantum yield QE of the fluorescent agent and an overlap parameter OL thereof defined by Formula (2) satisfy Formula (1):

$$OL \times (1-QE) < 0.07 \qquad \text{Formula (1)}$$

$$OL = \sum_{i=0}^{200} Abs(300 + 2 \times i) \times Flu(300 + 2 \times i) \qquad \text{Formula (2)}$$

here, Abs(300+2×i) is a relative intensity of an absorption spectrum normalized so that its peak intensity becomes 1; Flu(300+2×i) is a relative intensity of a fluorescence spec- (Continued)

trum normalized so that its peak intensity becomes 1; and i is a variable that increases from 0 to 200 by 2 at a time.

6 Claims, 7 Drawing Sheets

(56) References Cited

U.S. PATENT DOCUMENTS

| | | | |
|---|---|---|---|
| 2002/0041044 A1 | 4/2002 | Saito et al. | |
| 2003/0160178 A1 | 8/2003 | Katagiri | |
| 2005/0111813 A1 | 5/2005 | Hajto et al. | |
| 2009/0102489 A1* | 4/2009 | Lee | G02B 6/02052 324/536 |
| 2010/0237323 A1* | 9/2010 | Akai | C09K 11/565 257/13 |

FOREIGN PATENT DOCUMENTS

| | | |
|---|---|---|
| JP | 2009-104208 A | 5/2009 |
| JP | 2018-200172 A | 12/2018 |

OTHER PUBLICATIONS

Website, http://www.hyper-k.org/en/overview.html, About Hyper-Kamiokande, "Bringing Neutrino Research to the Next Level", retrieved Jan. 7, 2022.

ISR issued in International Patent Application No. PCT/JP2020/029155, Oct. 20, 2020, translation.

EESR issued in EP Patent Application No. 20846412.3, Jul. 19, 2023.

* cited by examiner

PLASTIC WAVELENGTH SHIFTING FIBER

TECHNICAL FIELD

The present invention relates to a plastic wavelength shifting fiber.

BACKGROUND ART

Scintillators such as inorganic scintillators, organic liquid scintillators, and plastic scintillators have been widely used for a long time in the field of detection of radiation such as detection of elementary particles, and are important components in the measurement of radiation. These scintillators contain a fluorescent agent that emits, when the scintillator is irradiated with radiation, blue light having a wavelength of about 430 nm, at which wavelength a photomultiplier tube has the maximum sensitivity. Note that a method in which blue light, which is emitted from a scintillator as it is irradiated with radiation, is not directly detected, but is indirectly detected by shifting the wavelength of the blue light generated by the scintillator into that of green light or the like in an optical fiber and making the obtained green light or the like propagate through the optical fiber has been known.

Such an optical fiber is called a wavelength shifting (WLS) fiber, in which the outer peripheral surface of a core that absorbs blue light generated by a scintillator and shifts its wavelength into that of green light or the like is covered (or coated) with a cladding having a refractive index lower than that of the core. In particular, plastic wavelength shifting fibers made of plastic are inexpensive and easy to process as compared to those made of glass. Therefore, like plastic scintillation fibers in which optical fibers themselves have scintillation properties, plastic wavelength shifting fibers are used in a wide range of applications such as particle physics researches.

As the base material for the core of a plastic wavelength shifting fiber, for example, polystyrene, which is a highly transparent resin material having a relatively high refractive index, is used. By using polystyrene as the base material for the core, a difference between refractive indices can be increased, thus making it possible to increase the total reflection angle with respect to the cladding. Therefore, it is possible to confine green light, which is generated by wavelength shifting inside the core, with a wider angle in the core and to transmit the confined green light to the end face of the fiber. That is, by using polystyrene as the base material for the core, it is possible to realize a wavelength shifting fiber having a high light emitting property.

FIG. 6 shows a principle based on which green light is emitted inside the core of a wavelength shifting fiber when it is irradiated with blue light. An organic fluorescent agent that absorbs blue light having a wavelength of about 430 nm, i.e., absorbs light emitted from a scintillator, and shifts the absorbed blue light into green light having a wavelength of about 550 nm, is dissolved (i.e., contained) in the base material for the core. Therefore, as shown in FIG. 6, part or all of the blue light that has been generated in the scintillator and crossed the inside of the wavelength shifting fiber is absorbed inside the core and shifted into green light.

Further, FIG. 7 shows a schematic diagram of a detector using a wavelength shifting fiber. As shown in FIG. 7, as blue light having a wavelength of about 430 nm generated by a scintillator crosses the inside of a plastic wavelength shifting fiber 1, it is absorbed by a fluorescent agent contained in a core 11 and shifted into green light having a wavelength of about 550 nm. The green light generated inside the core 11 propagates in the both directions toward the both ends of the plastic wavelength shifting fiber 1 while repeating total reflection at the interface between the core 11 and the cladding 12. Then, the green light that has been guided to one of the ends of the plastic wavelength shifting fiber 1 is detected as an electric signal by a photomultiplier tube (PMT).

Instead of using the PMT shown in FIG. 7, for example, a semiconductor detector such as a silicon photodiode (Si-PM) using a silicon avalanche photodiode (Si-APD) may be used. Recently, for example, multi-pixel photon counter (MPPC) arrays in which a large number of small segmented Si-PMs are arranged are widely used. In such an MPPC array, each pixel is connected to a respective one of wavelength shifting fibers, so that green light generated in these wavelength shifting fibers can be simultaneously detected.

For detectors used in particle physics researches, it is important to distinguish an event(s) to be observed from noise events (background events), so it has long been desired to improve the temporal and position resolutions of detectors. Patent Literature 1 discloses a scintillator in which the lifetime of fluorescence is shortened in order to improve the temporal resolution of the detector. Further, Non-patent Literature 1 discloses a method for improving the position resolution of the detection of blue light by reducing the diameter of a fiber.

It should be noted that in the case where the probability of the occurrence of an event to be observed is low, the frequency with which the event is observed can be improved by increasing the size of the detection apparatus. For example, as disclosed in Non-patent Literature 2, the construction of Hyper-Kamiokande having a detection volume 10 times as large as that of Super-Kamiokande is currently being planned.

Note that Patent Literatures 2 and 3 will be referred to later in the descriptions of embodiments according to the present invention.

CITATION LIST

Patent Literature

Patent Literature 1: Japanese Unexamined Patent Application Publication No. 2003-248061
Patent Literature 2: Japanese Unexamined Patent Application Publication No. 2002-116327
Patent Literature 3: Japanese Unexamined Patent Application Publication No. 2009-104208

Non Patent Literature

Non-patent Literature 1: Christian Joram, "The new Fibre Tracker for LHCb", [online], May 23, 2014, the Internet <URL: https://lhcb-doc. web.cern.ch/lhcb-doc/presentations/Seminars/postscript/PH_detector_seminar_Sci-Fi.pdf>
Non-patent Literature 2: "About Hyper-Kamiokande", [online], the Internet <URL: http://www.hyper-k.org/overview.html>

SUMMARY OF INVENTION

Technical Problem

The inventors have found the following problems in regard to plastic wavelength shifting fibers.

The smaller the diameter of a wavelength shifting fiber is, the more likely the light is attenuated and the shorter the transmittable distance becomes. Note that when the size of the apparatus is increased, the distance over which the light needs to be transmitted by using the wavelength shifting fiber increases. Therefore, a plastic wavelength shifting fiber that can, even when the diameter of the fiber is small, transmit light over a long distance is required.

An object of the present invention is to provide a plastic wavelength shifting fiber in which the lifetime of fluorescence is short, and which can transmit light over a long distance even when the diameter of the fiber is small.

Solution to Problem

A plastic wavelength shifting fiber according to an aspect of the present invention includes:
a core containing a fluorescent agent having a peak of a fluorescence spectrum in a wavelength range of 450 to 550 nm; and
a cladding covering an outer peripheral surface of the core and having a refractive index lower than that of the core.
A sum of the number of carbon atoms of the fluorescent agent and the number of oxygen atoms thereof is 10 to 25, and
a quantum yield QE of the fluorescent agent and an overlap parameter OL thereof defined by a below-shown Formula (2) satisfy a below-shown Formula (1):

$$OL \times (1-QE) < 0.07 \quad \text{Formula (1)}$$

$$OL = \sum_{i=0}^{200} Abs(300 + 2 \times i) \times Flu(300 + 2 \times i) \quad \text{Formula (2)}$$

in the Formula (2): Abs(300+2×i) is a relative intensity of an absorption spectrum normalized so that its peak intensity becomes 1; Flu(300+2×i) is a relative intensity of a fluorescence spectrum normalized so that its peak intensity becomes 1; and i is a variable that increases from 0 to 200 by 2 at a time.

It is possible to provide a plastic wavelength shifting fiber in which the lifetime of fluorescence is short, and which can transmit light over a long distance even when the diameter of the fiber is small.

The fluorescent agent may be a coumarin-based compound. In particular, the fluorescent agent may be 3-aryl-7-dialkylaminocoumarin (in which an aryl group is an aromatic or heteroaromatic ring having a carbon number of 4 to 6, and a carbon number of an alkyl group substituted in an amino group is 1 to 4).

The fluorescent agent may be a thiazole-based compound. In particular, the fluorescent agent may be 4-formyl-5-(4-dialkylaminophenyl) thiazole (in which a carbon number of an alkyl group substituted in an amino group is 1 to 4), or 4-(4-dialkylaminophenyl)-5-formylthiazole (in which a carbon number of an alkyl group substituted in an amino group is 1 to 4). Further, an outer diameter may be 3.0 mm or smaller.

Advantageous Effects of Invention

According to the present invention, it is possible to provide a plastic wavelength shifting fiber in which the lifetime of fluorescence is short, and which can transmit light over a long distance even when the diameter of the fiber is small.

DESCRIPTION OF EMBODIMENTS

Figure 1:
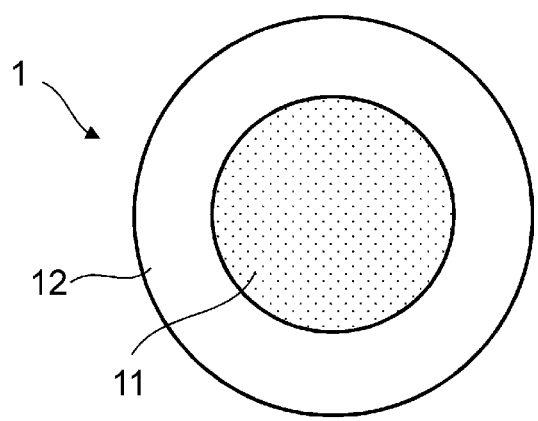
FIG. 1 is a cross-sectional view of an example of a plastic wavelength shifting fiber according to a first embodiment.

A plastic wavelength shifting fiber according to a first embodiment of the present invention will be described with reference to FIG. 1. FIG. 1 is a cross-sectional view of an example of a plastic wavelength shifting fiber according to an embodiment. As shown in FIG. 1, the plastic wavelength shifting fiber 1 according to this embodiment is circular in cross section, and includes a core 11 and a cladding 12 covering the outer peripheral surface of the core 11. The cladding 12 may have a multi-cladding structure by using the cladding 12 as an inner cladding, and further providing an outer cladding (not shown) having a refractive index lower than that of the inner cladding on the outer peripheral surface of the cladding 12. By adopting the multi-cladding structure, it is possible to capture (i.e., collect) light over a wider angle and make the captured light propagate through the fiber, so that the detection sensitivity is improved.

The core 11 is made of a transparent resin containing a fluorescent agent that absorbs blue light and emits green light. As the base material for the core, for example, a styrene-based resin, which is inexpensive and easy to use, is used. Details of the base material for the core and the fluorescent agent, which constitute the core 11, will be described later.

The cladding 12, which covers the outer peripheral surface of the core 11, is made of a transparent resin having a refractive index lower than that of the core 11. The base material for the cladding, which constitutes the cladding 12, will be described later.

The outer diameter of the plastic wavelength shifting fiber is, for example, 3.0 mm or smaller, and preferably 2.0 mm or smaller. Further, the outer diameter of the plastic wavelength shifting fiber is, for example, 0.1 mm or larger, and preferably 0.2 mm or larger.

In the plastic wavelength shifting fiber according to this embodiment, the sum of the number of carbon atoms and the number of oxygen atoms contained in each molecule of the fluorescent agent, the overlap between the absorption spectrum of the fluorescent agent and the emission spectrum thereof, and the quantum yield of the fluorescent agent are controlled. Therefore, in the plastic wavelength shifting fiber according to this embodiment, the lifetime of fluorescence is short, and light can be transmitted over a long distance even when the diameter of the fiber is small.

A principle for these features will be described hereinafter.

Figure 6:
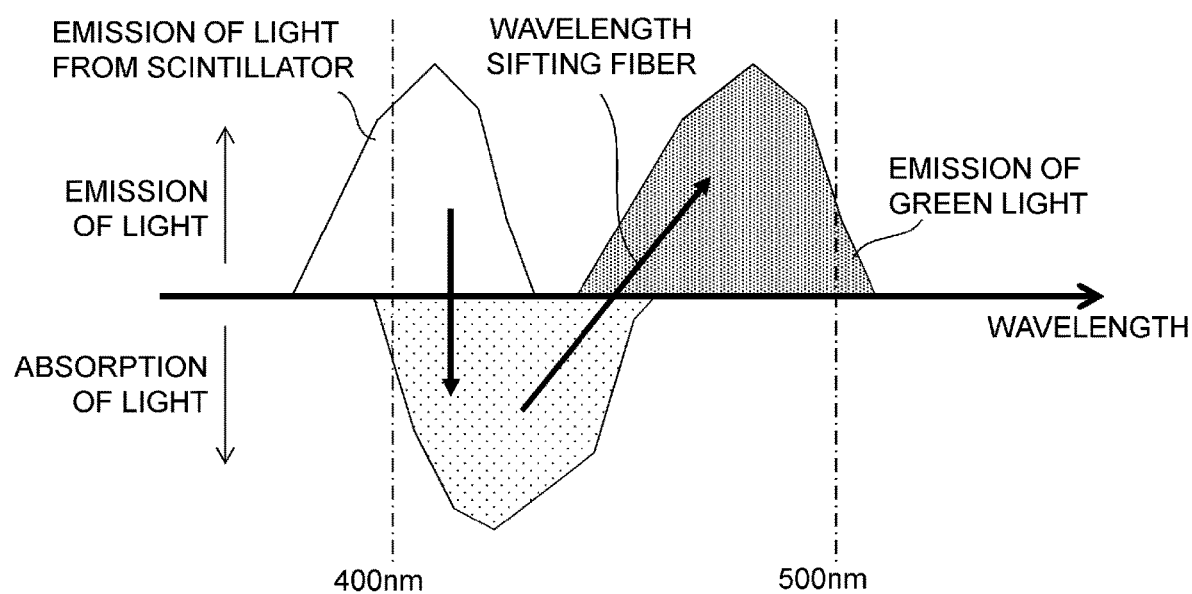
FIG. 6 is a diagram for explaining a principle based on which green light is emitted within the core of a wavelength shifting fiber when it is irradiated with blue light.
Figure 7:
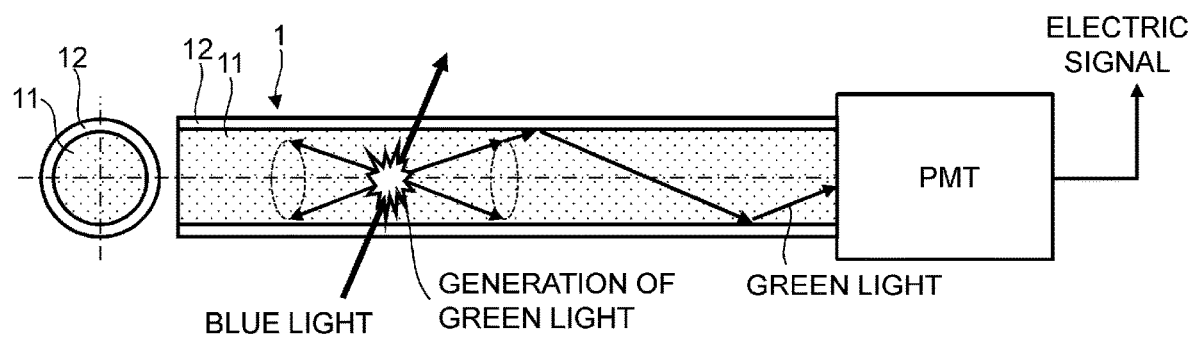
FIG. 7 is a schematic diagram of a detector using a wavelength shifting fiber.

A more detailed description will be given with reference to the above-described FIG. 6.

Fluorescence is a phenomenon in which molecules of a fluorescent agent absorb energy and are excited, and then emit light having a wavelength longer than that of the absorbed light, and is a phenomenon that is often observed in π-conjugated organic compounds. The π-conjugated organic compound has a repetitive structure of double bonds and single bonds.

The inventors have conducted researches on various π-conjugated organic compounds that emit green fluorescence in a wavelength range of 450 to 550 nm, and found that the total number of carbon atoms and oxygen atoms has a correlation with the lifetime of fluorescence emitted from the fluorescent agent. This is probably because carbon atoms and oxygen atoms are capable of forming double bonds, and greatly contribute to the π-conjugated structure in which double bonds are necessary. As a result of experiments, details of which will be described later, it has been decided that the sum of the number of carbon atoms and the number of oxygen atoms in the fluorescent agent should be 10 to 25.

Next, the fluorescent agent contained in the plastic wavelength shifting fiber (hereinafter also referred to simply as "the fiber") satisfies the below-shown Formula (1) in order to enable light to be transmitted over a long distance even when the diameter of the fiber is small.

$$OL \times (1-QE) < 0.07 \quad \text{Formula (1)}$$

where OL represents an overlap parameter defined by the inventors, and QE represents a quantum yield.

Details of the Formula (1) will be described hereinafter.

Fluorescence generated in the fluorescent agent gradually attenuates, while being guided (i.e., propagating) through the fiber, because of absorption by the fluorescent agent and impurities and according to the transmission property of the fiber. A distance at which the intensity of the light becomes 1/e (e: the base of the natural logarithm) is called an attenuation length (AL), and is used as one of indicators indicating the optical properties of the fiber. Needless to say, the larger the attenuation length AL is, the longer distance the light can be transmitted.

Figure 2:
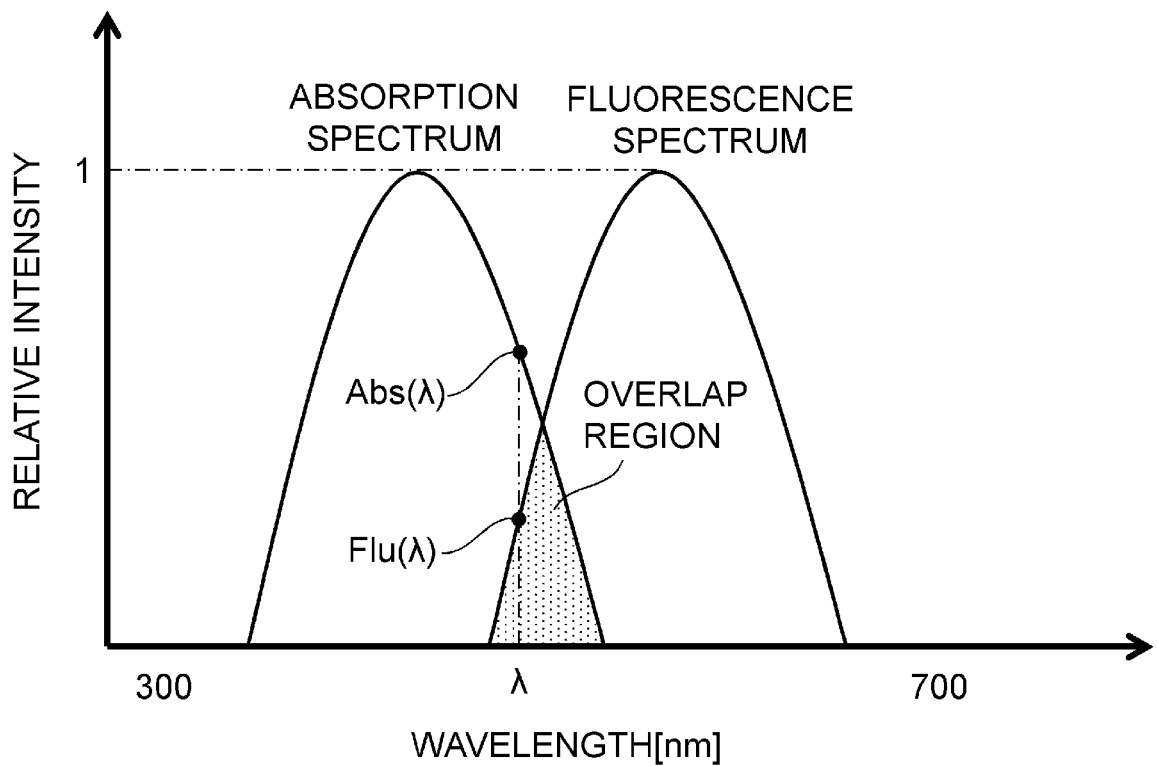
FIG. 2 is a schematic diagram for explaining reabsorption by a fluorescent agent.

As one of the causes for the attenuation of fluorescence, reabsorption by the fluorescent agent has been known. This reabsorption by the fluorescent agent will be described with reference to FIG. 2. FIG. 2 is a schematic diagram for explaining the reabsorption by the fluorescent agent. As shown in FIG. 2, each of the absorption spectrum and the fluorescence spectrum of the fluorescent agent is normalized so that its peak intensity becomes 1. Each of the absorption spectrum and the fluorescence spectrum has a certain width, and as shown in FIG. 2, in some cases, they have an overlap region on the short-wavelength side of the fluorescence spectrum and the long-wavelength side of the absorption spectrum. In FIG. 2, the overlap region is indicated by shading.

As shown in FIG. 2, when there is an overlap region, part of the short-wavelength light of the fluorescence propagating through the fiber is reabsorbed by the fluorescent agent. It is considered that when both the relative intensity Abs($\lambda$) of the absorption spectrum and the relative intensity Flu($\lambda$) of the fluorescence spectrum are high at the wavelength $\lambda$, reabsorption is likely to occur. Therefore, the product of the relative intensity Abs($\lambda$) of the absorption spectrum and the relative intensity Flu($\lambda$) of the fluorescence spectrum is used as an indicator of the likelihood of the occurrence of reabsorption. Therefore, a value that is obtained by adding up (or integrating) the aforementioned product over the overlap region is used as an overlap parameter OL, and which is defined by the below-shown Formula (2).

$$OL = \sum_{i=0}^{200} Abs(300 + 2 \times i) \times Flu(300 + 2 \times i) \quad \text{Formula (2)}$$

Note that as shown in the Formula (2), the wavelength range in which the overlap parameter OL is determined is set to 300 to 700 nm based on the wavelength range of the absorption and fluorescence of typical fluorescent materials that emit green light. In the Formula, i is a variable that increases from 0 to 200 by 2 at a time. That is, in the Formula (2), the product of the relative intensity Abs($\lambda$) of the absorption spectrum and the relative intensity Flu($\lambda$) of the fluorescence spectrum is added up (or integrated) at intervals of 2 nm in the wavelength range of 300 to 700 nm.

As obvious from FIG. 2, the product of the relative intensity Abs($\lambda$) of the absorption spectrum and the relative intensity Flu($\lambda$) of the fluorescence spectrum has a positive value when the wavelength $\lambda$, is within the wavelength range of the overlap region, and is zero when the wavelength $\lambda$, is outside the wavelength range of the overlap region. The wider the wavelength range of the overlap region shown in FIG. 2 is, and the greater the intensities of the absorption spectrum and the fluorescence spectrum in the overlap region are, the larger the value of the overlap parameter OL becomes, and the more likely the reabsorption occurs.

Next, when the light is reabsorbed by the fluorescent agent, the reabsorbed light (i.e., the reabsorbed energy) is emitted as fluorescence again according to the value of the quantum yield QE. The quantum yield QE indicates a ratio of emitted light to absorbed light, and is typically equal to or lower than 1. That is, the amount of the light that is re-emitted as a result of the reabsorption is smaller than that of the reabsorbed light, and its loss rate is expressed as (1−QE). Therefore, in order to increase the attenuation length AL, it is preferred that reabsorption be less likely to occur and the quantum yield QE be high (i.e., the loss rate (1−QE) be small). Conversely, when reabsorption is likely to occur and the loss rate (1−QE) is high, the attenuation length AL decreases.

Therefore, the larger the product OL×(1−QE) of the overlap parameter OL, which is the indicator of the likelihood of the occurrence of reabsorption, and the loss rate (1−QE) is, the shorter the attenuation length AL becomes. Conversely, the smaller the product OL×(1−QE) is, the longer the attenuation length AL becomes. In experiments, when the value expressed as "OL×(1−QE)" was smaller than 0.07, the attenuation length AL was equal to or longer than 300 cm. Therefore, the condition for the fluorescent agent that has a long attenuation length AL and exhibits excellent optical properties was defined by the above-shown Formula (1).

<Base Material for Core>

As the base material for the core, a transparent resin material having a relatively high refractive index is preferably used. A preferred base material is, for example, a polymer that is obtained by polymerizing one type of monomer selected from a group of monomers consisting of benzyl methacrylate, phenyl methacrylate, cyclohexyl methacrylate, chlorobenzyl methacrylate, 1-phenylethyl methacrylate, 1,2-diphenyl ethyl methacrylate, diphenyl ethyl methacrylate, furfuryl methacrylate, 1-phenylcyclohexyl methacrylate, pentachlorophenyl methacrylate, pentabromophenyl methacrylate, 1-naphthyl methacrylate, 2-naphthyl methacrylate, styrene, α-methylstyrene, and vinyltoluene.

Further, another suitable base material is a copolymer that is obtained by copolymerizing at least two types of monomers selected from a group of monomers consisting of methyl methacrylate, benzyl methacrylate, phenyl methacrylate, cyclohexyl methacrylate, chlorobenzyl methacrylate, 1-phenylethyl methacrylate, 1,2-diphenyl ethyl methacrylate, diphenyl ethyl methacrylate, furfuryl methacrylate, 1-phenylcyclohexyl methacrylate, pentachlorophenyl methacrylate, pentabromophenyl methacrylate, 1-naphthyl methacrylate, 2-naphthyl methacrylate, styrene, α-methylstyrene, and vinyltoluene. For the polymerization, an ordinary polymerization initiator(s) and an ordinary molecular-weight modifier(s) may be added.

<Base Material for Cladding>

A suitable base material for the cladding is, for example, a polymer that is obtained by polymerizing or copolymerizing at least one type of monomer selected from a group of monomers consisting of methyl methacrylate, ethyl methacrylate, butyl methacrylate, propyl methacrylate, cyclohexyl methacrylate, methyl acrylate, ethyl acrylate, propyl acrylate, and butyl acrylate. Among them, a polymer of methyl methacrylate or a copolymer of methyl methacrylate and another monomer(s) is preferred. Methyl methacrylate has an advantage that its transparency is high, and it is easy to use because it is easily polymerized. For the polymerization, an ordinary polymerization initiator(s) and an ordinary molecular-weight modifier(s) may be added.

Further, as the base material for the outer cladding, a commercially available material may be used as long as it has a refractive index lower than that of the above-described base material for the cladding. Specifically, examples of suitable base materials include: polymers that are obtained by polymerizing or copolymerizing at least one type of monomer selected from a group of monomers consisting of methyl methacrylate, 2,2,2-trifluoroethyl methacrylate, 2,2,3,3-tetrafluoropropyl methacrylate, 2,2,3,3,3-pentafluoropropyl methacrylate, 2,2,3,4,4,4-hexafluorobutyl methacrylate, 2,2,3,3,4,4,5,5-octafluoropentyl methacrylate, methyl α-fluoroacrylate, 2-(trifluoromethyl)methyl propenoate, and vinylidene fluoride; and mixtures of the aforementioned polymers and poly vinylidene fluoride. In particular, a mixture of 2,2,2-trifluoroethyl methacrylate polymer and polyvinylidene fluoride is preferred.

<Fluorescent Agent>

The fluorescent agent has a peak of a fluorescence spectrum in a wavelength range of 450 to 550 nm, and absorbs blue light and shifts the wavelength of the absorbed blue light into that of green light. There are no restrictions on the above-described fluorescent agent as long as the sum of the number of carbon atoms and the number of oxygen atoms is 10 to 25 and the fluorescent agent satisfies the above-shown Formula (1). For example, coumarin-based compounds and thiazole-based compounds are preferred.

Examples of the coumarin-based compounds include 3-aryl-7-dialkylaminocoumarin (in which an aryl group is an aromatic or heteroaromatic ring having a carbon number of 4 to 6, and a carbon number of an alkyl group substituted in an amino group is 1 to 4). Specifically, examples of the coumarin-based compounds include a coumarin-based compound having a substituent having a small molecular weight, such as 7-(diethylamino)-3-phenylcoumarin or 7-(diethylamino)-3-(2-thienyl)coumarin.

Examples of the thiazole-based compounds include 4-formyl-5-(4-dialkylaminophenyl) thiazole (in which a carbon number of an alkyl group substituted in an amino group is 1 to 4) and 4-(4-dialkylaminophenyl)-5-formylthiazole (in which a carbon number of an alkyl group substituted in an amino group is 1 to 4).

When selecting a wavelength shifting fluorescent agent, it is preferred that its solubility in a monomer used as the raw material for the base material for the core, and in its polymer be high. The concentration of the fluorescent agent is preferably 30 to 10,000 mass ppm, more preferably, 50 to 1,000 mass ppm, and still more preferably 100 to 500 mass ppm is suitable. A preferred indicator for the concentration is the molar absorption coefficient of the fluorescent agent. For example, in the case of a wavelength shifting fiber having a diameter of 1 mm, the concentration of the fluorescent agent is adjusted so that it can absorb, while blue light emitted from the scintillator crosses (i.e., travels) a length of 1 mm inside the fiber, 70 to 99% of that blue light.

<Manufacturing Method of Fiber>

There are no restrictions on the method for manufacturing a wavelength shifting fiber. For example, a rod drawing method can be used. In the rod drawing method, a preform rod is manufactured by inserting a transparent rod-shaped polymer for a core (a rod for a core) made of a base material having a high refractive index into a cylindrical transparent polymer for cladding (a pipe for cladding) made of a base material having a low refractive index, and then the tip of the manufactured preform rot is heated and thereby finely drawn.

<Manufacturing Method of Rod for Core>

A rod for a core can be manufactured by putting a monomer in a cylindrical polymerization container and performing thermal polymerization. As the polymerization method, a spontaneous polymerization that is performed by just heating the monomer without adding any initiator is preferred. However, a minimal amount of a thermal cleavage-type radical initiator may be added. Further, a photo cleavable-type radical initiator may be used in combination with the thermal cleavage-type radical initiator. Further, if the molecular weight of the rod for the core is too low, its mechanical strength and reliability required as an optical fiber may not be ensured. On the other hand, if the molecular weight is too high, the heating temperature needs to be raised because the viscosity of the molten material increases, thus possibly causing problems such as coloring caused by thermal degradation and thermal decomposition. Therefore, a molecular-weight modifier(s) may be added as required.

<Manufacturing Method of Pipe for Cladding>

A pipe for cladding can be manufactured by charging thermoplastic resin pellets into a melt extruder equipped with a circular die and extruding them into a pipe shape. Alternatively, a method in which a monomer is pressed onto a side surface of a rotating cylindrical container by a centrifugal force, so that the monomer is polymerized and solidified while forming a hollow part, may be used. Alternatively, a method in which a hollow part is formed by drilling a hole at the axial center of a rod-shaped polymer may be used.

<Property of Fiber>

As described above, the concentration of the fluorescent agent is adjusted so that 70 to 99% of blue light can be absorbed at the outer diameter of the fiber. In the case of a single-cladding structure having an outer diameter of 1 mm, as an optical property of the fiber, the attenuation length AL is preferably longer than 300 cm (Attenuation Length AL>300 cm). The attenuation length AL can be adjusted by changing the structure of the cladding, the type of the fluorescent agent, the concentration of the fluorescent agent, and/or the outer diameter of the fiber.

EXAMPLES

The present invention will be described hereinafter in a more detailed manner by using examples, but is not limited by those examples at all.

In Table 1, molecular structures, molecular weights, classifications, molecular formulas, numbers obtained by an expression "(Number of carbon atoms)+(Number of oxygen atoms)" ("C+O" in Table 1), and lifetimes of fluorescence (ns) of fluorescent agents according to Examples 1 to 3 are summarized.

Note that the lifetime of fluorescence was obtained by performing measurement on a solvent in which a fluorescent agent having a dilute concentration of about 10 ppm was dissolved in a styrene monomer by using a compact fluorescence lifetime measuring apparatus Quantaurus-Tau manufactured by Hamamatsu Photonics K.K. As the excitation wavelength, light having a wavelength close to the peak wavelength was selected according to the absorption spectrum of the fluorescent agent-containing solvent.

TABLE 1

| | Example 1 | Example 2 | Example 3 |
|---|---|---|---|
| Structural Formula | (thiazole structure) | (coumarin structure) | (coumarin structure) |
| Molecular Weight | 233 | 299 | 293 |
| Classification | thiazole | coumarin | coumarin |
| Molecular Formula | $C_{12}H_{12}N_2OS$ | $C_{16}H_{17}NO_2S$ | $C_{19}H_{19}NO_2$ |
| C + O | 13 | 18 | 21 |
| Lifetime of Fluorescence (ns) | 2.3 | 2.6 | 2.3 |

Example 1

A thiazole-based fluorescent agent listed in Table 1 was used. The sum of carbon atoms and oxygen atoms was 13, and the lifetime of fluorescence was 2.3 ns.

Example 2

A coumarin-based fluorescent agent, in particular, 7-(di-ethylamino)-3-(2-thienyl)coumarin listed in Table 1, was used. The sum of carbon atoms and oxygen atoms was 18, and the lifetime of fluorescence was 2.6 ns.

Example 3

A coumarin-based fluorescent agent, in particular, 7-(di-ethylamino)-3-phenylcoumarin listed in Table 1, was used. The sum of carbon atoms and oxygen atoms was 21, and the lifetime of fluorescence was 2.3 ns.

In Table 2, molecular structures, molecular weights, classifications, molecular formulas, numbers obtained by an expression "(Number of carbon atoms)+(Number of oxygen atoms)" ("C+O" in Table 2), and lifetimes of fluorescence (ns) of fluorescent agents according to Comparative Examples 1 to 4 are summarized.

TABLE 2

| | Comparative Example 1 | Comparative Example 2 |
|---|---|---|
| Structural Formula | (perylene diester structure) | (coumarin-benzothiazole structure) |
| Molecular Weight | 452 | 350 |
| Classification | perylene | coumarin |
| Molecular Formula | $C_{30}H_{28}O_4$ | $C_{20}H_{18}N_2O_2S$ |
| C + O | 34 | 22 |
| Lifetime of Fluorescence (ns) | 3.8 | 2.4 |

TABLE 2-continued

| | Comparative Example 3 | Comparative Example 4 |
|---|---|---|
| Structural Formula | (coumarin-benzoxazole structure with diethylamino group and Cl substituent) | |
| Molecular Weight | 352 | 373 |
| Classification | coumarin | xanthene |
| Molecular Formula | $C_{20}H_{17}N_2O_3Cl$ | $C_{23}H_{19}NO_4$ |
| C + O | 23 | 27 |
| Lifetime of Fluorescence (ns) | 2.2 | 5.7 |

Comparative Example 1

A perylene-based fluorescent agent listed in Table 1 was used. The sum of carbon atoms and oxygen atoms was 34, and the lifetime of fluorescence was 3.8 ns.

Comparative Example 2

A coumarin-based fluorescent agent listed in Table 1 was used. The sum of carbon atoms and oxygen atoms was 22, and the lifetime of fluorescence was 2.4 ns.

Comparative Example 3

A coumarin-based fluorescent agent listed in Table 1 was used. The sum of carbon atoms and oxygen atoms was 23, and the lifetime of fluorescence was 2.2 ns.

Comparative Example 4

A xanthene-based fluorescent agent listed in Table 1 was used. The sum of carbon atoms and oxygen atoms was 27, and the lifetime of fluorescence was 5.7 ns.

Figure 3:
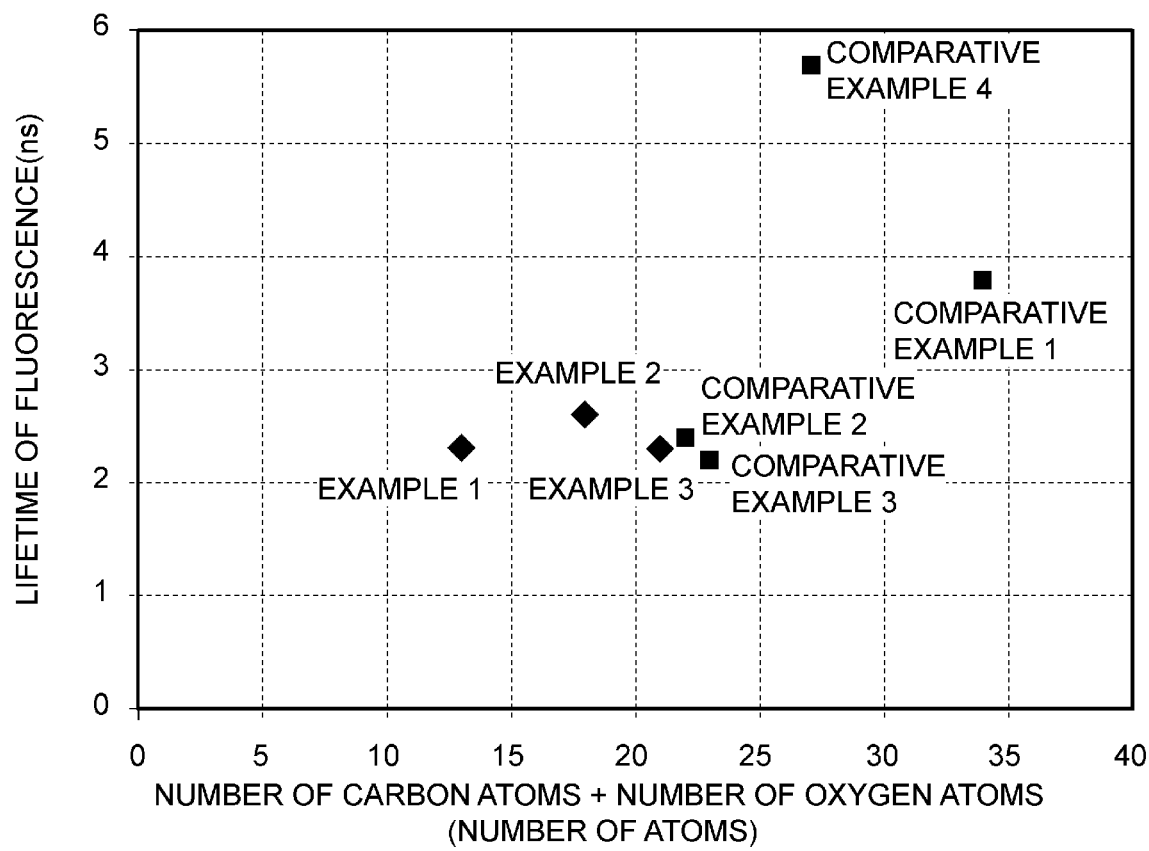
FIG. 3 is a graph showing a relation between the sum of a carbon number and an oxygen number in a fluorescent agent and the lifetime of fluorescence.

Here, FIG. 3 is a graph showing a relation between the sum of a carbon number and an oxygen number (i.e., number of oxygen atoms) in a fluorescent agent and the lifetime of fluorescence. As shown in Tables 1, 2 and 3, when the sum of the number of carbon atoms and the number of oxygen atoms exceeds 25, the lifetime of fluorescence exceeds 3 ns, so it is undesirable.

Therefore, as will be described below, fibers using the fluorescent agents according to the Examples 1 to 3 and the Comparative Examples 2 and 3, respectively, in each of which the lifetime of fluorescence was equal to or shorter than 3 ns, were manufactured, and their attenuation lengths AL were evaluated. Further, the relation between the attenuation length AL and the overlap parameter OL of the fluorescent agent, and the relation between the attenuation length AL and the quantum yield QE of the fluorescent agent were evaluated. Specifically, the relation between the attenuation length AL and the value expressed as OL×(1−QE) shown in the Formula (1) was evaluated.

[Evaluation of Fluorescent Agent in Monomer Solvent]
[Measurement of Absorption Spectrum]

The absorption spectrum was obtained by performing measurement on a solvent in which a fluorescent agent having a dilute concentration of about 10 ppm was dissolved in a styrene monomer by using a UV-Visible-IR Spectrophotometer UV3600 manufactured by Shimadzu Corporation. The measurement range of the spectrum was 300 to 700 nm.

[Measurement of Fluorescence Spectrum]

The fluorescence spectrum was obtained by performing measurement on a solvent in which a fluorescent agent having a dilute concentration of about 10 ppm was dissolved in a styrene monomer by using a fluorescence spectrophotometer FluoroMax-4 manufactured by HORIBA, Ltd. In the measurement, the excitation wavelength was set to a wavelength at which the absorption by the respective fluorescent agent was maximized. The measurement range of the spectrum was 300 to 700 nm.

[Evaluation of Overlap Parameter OL]

The obtained absorption spectrums and the fluorescence spectrums were normalized so that their peak intensities became 1, and the overlap parameters OL were obtained by using the above-shown Formula (2).

[Measurement of Quantum Yield QE]

The quantum yield QE was obtained by performing measurement on a solvent in which a fluorescent agent having a dilute concentration of about 10 ppm was dissolved in a styrene monomer by using an absolute PL quantum yield measuring apparatus Quantaurus-QY manufactured by Hamamatsu Photonics K.K. In the measurement, the excitation wavelength was set to a wavelength at which the absorption by the respective fluorescent agent was maximized.

[Evaluation of Property of Fiber Using Fluorescent Agent]
[Manufacturing Method of Fiber]

Fibers containing the fluorescent agents according to the Examples 1 to 3 and the Comparative Examples 2 and 3, respectively, were manufactured in accordance with the methods disclosed in Patent Literatures 2 and 3. Each fiber had an outer diameter of 1 mm and a single-cladding structure. The concentration of the fluorescent agent was adjusted so that the fluorescent agent absorb, while blue light crosses (i.e., travels) a length of 1 mm inside the fiber, 70 to 99% of that blue light.

[Measurement of Attenuation Length AL]

Figure 4:
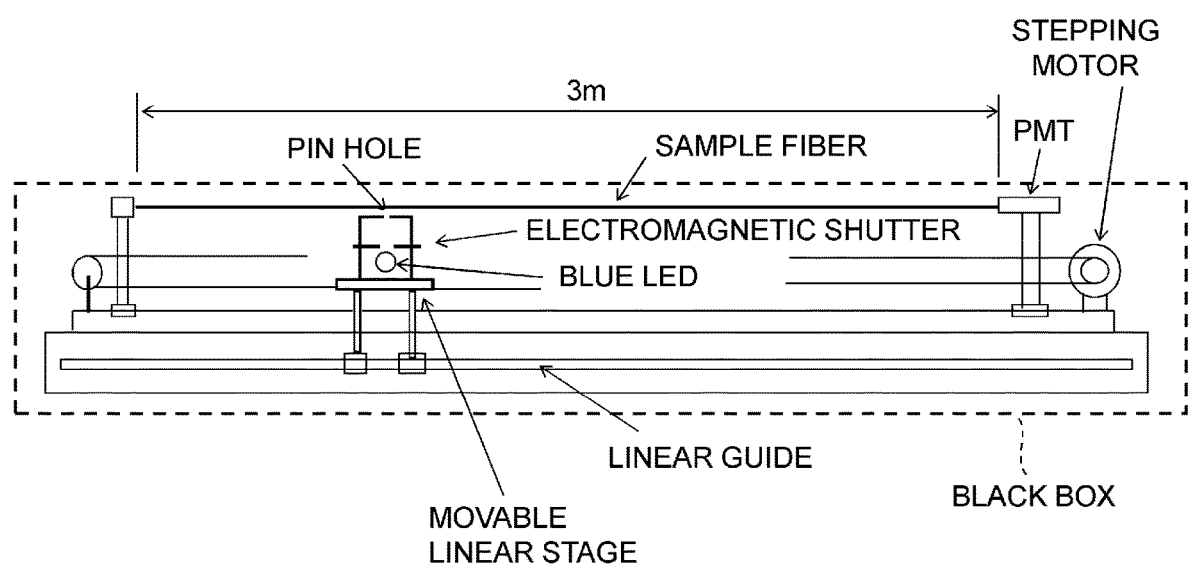
FIG. 4 is a schematic diagram of an attenuation length measuring apparatus.

The attenuation lengths AL of the fibers were measured by using the apparatus shown in FIG. 4. FIG. 4 shows a schematic diagram of an attenuation length measuring apparatus. In the attenuation length measuring apparatus shown in FIG. 4, blue light was applied to (i.e., was made to enter) a sample fiber while changing a distance from a photomultiplier tube (PMT), and the intensity of the light that had been guided (i.e., had propagated) through the sample fiber was observed by the PMT. A blue LED having a peak wavelength at 470 nm was used as a light source. As the PMT, a photomultiplier tube R647 manufactured by Hamamatsu Photonics K.K. was used. Data for light-guiding distances (i.e., propagation distances) of 100 to 285 cm were used, and the attenuation length AL was calculated from a relational expression between the light-guiding distance and the detected intensity of the light.

As shown in FIG. 4, the attenuation length measuring apparatus is covered (i.e., enclosed) by a black box in order to block any light from the outside. The blue LED is disposed on a movable linear stage that can be moved in the longitudinal direction of the sample fiber. The movable linear stage is driven by a stepping motor and moves on a linear guide that extends in parallel with the sample fiber. Blue light emitted from the blue LED is made to enter the sample fiber through an electromagnetic shutter and a pinhole provided on the movable linear stage.

[Evaluation Result]

In Table 3, results of the evaluations of the fluorescent agents and fibers using them according to the Examples 1 to 3 and the Comparative Examples 2 and 3, respectively, are summarized. In Table 3, from the top, absorption peak wavelengths (nm) of the fluorescent agents, emission peak wavelengths (nm) thereof, overlap parameters OL, quantum yields QE, values 1−QE, values OL×(1−QE), concentrations (ppm) of the fluorescent agents in the fibers, and attenuation lengths AL (cm) of the fibers are listed.

TABLE 3

|  | Example 1 | Example 2 | Example 3 | Comparative Example 2 | Comparative Example 3 |
| --- | --- | --- | --- | --- | --- |
| Absorption Peak Wavelength (nm) | 416 | 422 | 395 | 444 | 439 |
| Emission Peak Wavelength (nm) | 496 | 494 | 474 | 488 | 486 |
| Overlap Parameter OL | 0.13 | 0.34 | 0.11 | 0.51 | 0.39 |
| Quantum Yield QE | 0.8 | 0.86 | 0.93 | 0.83 | 0.82 |
| 1−QE | 0.20 | 0.14 | 0.07 | 0.17 | 0.18 |
| OL × (1−QE) | 0.03 | 0.05 | 0.01 | 0.09 | 0.07 |
| Fluorescent Agent Concentration (ppm) | 125 | 125 | 200 | 125 | 100 |
| Attenuation Length AL (cm) | 313 | 360 | 477 | 186 | 154 |

Example 1

The overlap parameter OL was 0.13 (OL=0.13), and the quantum yield QE was 0.8 (QE=0.8). Further, the value OL×(1−QE) was 0.03 (OL×(1−QE)=0.03). Under that condition that the concentration of the fluorescent agent was 125 ppm, the attenuation length AL of the fiber was 313 cm, which was longer than the target of 300 cm and hence was excellent.

Example 2

The overlap parameter OL was 0.34 (OL=0.34), and the quantum yield QE was 0.86 (QE=0.86). Further, the value OL×(1−QE) was 0.05 (OL×(1−QE)=0.05). Under that condition that the concentration of the fluorescent agent was 125 ppm, the attenuation length AL of the fiber was 360 cm, which was longer than the target of 300 cm and hence was excellent.

Example 3

The overlap parameter OL was 0.11 (OL=0.11), and the quantum yield QE was 0.93 (QE=0.93). Further, the value OL×(1−QE) was 0.01 (OL×(1−QE)=0.01). Under that condition that the concentration of the fluorescent agent was 200 ppm, the attenuation length AL of the fiber was 477 cm, which was longer than the target of 300 cm and hence was excellent.

Comparative Example 2

The overlap parameter OL was 0.51 (OL=0.51), and the quantum yield QE was 0.83 (QE=0.83). Further, the value OL×(1−QE) was 0.09 (OL×(1−QE)=0.09). Under that condition that the concentration of the fluorescent agent was 125 ppm, the attenuation length AL of the fiber was 186 cm, which was shorter than the target of 300 cm.

Comparative Example 3

The overlap parameter OL was 0.39 (OL=0.39), and the quantum yield QE was 0.82 (QE=0.82). Further, the value OL×(1−QE) was 0.07 (OL×(1−QE)=0.07). Under that condition that the concentration of the fluorescent agent was 100 ppm, the attenuation length AL of the fiber was 154 cm, which was shorter than the target of 300 cm.

Figure 5:
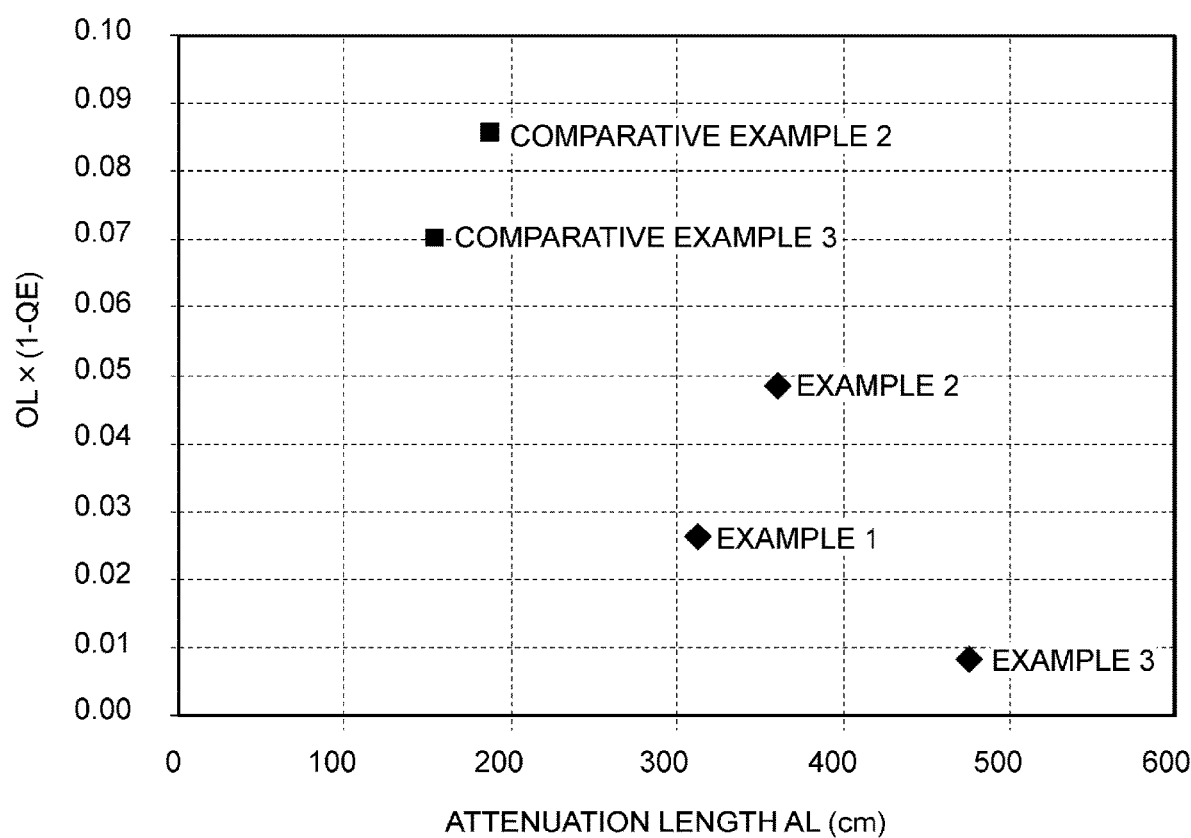
FIG. 5 is a graph showing a relation between the attenuation lengths AL of fibers and values expressed as OL×(1−QE) of fluorescent agents.

Here, FIG. 5 is a graph showing a relation between the attenuation lengths AL of fibers and values expressed as OL×(1−QE) of fluorescent agents. As shown in Table 3 and FIG. 5, it has been found that there is a tendency that the attenuation length AL increases as the value OL×(1−QE) decreases. Specifically, when the value OL×(1−QE) was smaller than 0.07, the attenuation length AL was equal to or longer than 300 cm.

The present invention is not limited to the above-described embodiments, and they may be modified as desired without departing from the scope and spirit of the present invention.

This application is based upon and claims the benefit of priority from Japanese patent application No. 2019-139408, filed on Jul. 30, 2019, the disclosure of which is incorporated herein in its entirety by reference.

REFERENCE SIGNS LIST

1 PLASTIC WAVELENGTH SHIFTING FIBER
11 CORE
12 CLADDING

The invention claimed is:

1. A plastic wavelength shifting fiber comprising:
a core containing a fluorescent agent having a peak of a fluorescence spectrum in a wavelength range of 450 to 550 nm; and
a cladding covering an outer peripheral surface of the core and having a refractive index lower than that of the core, wherein
a sum of a number of carbon atoms of the fluorescent agent and a number of oxygen atoms of the fluorescent agent is 10 to 25, and
a quantum yield QE of the fluorescent agent and an overlap parameter OL thereof defined by a below-shown Formula (2) satisfy a below-shown Formula (1):

$$OL \times (1-QE) < 0.07 \quad \text{Formula (1)}$$

$$OL = \sum_{i=0}^{200} \text{Abs}(300 + 2 \times i) \times Flu(300 + 2 \times i) \quad \text{Formula (2)}$$

in the Formula (2): Abs(300+2×i) is a relative intensity of an absorption spectrum normalized so that its peak intensity becomes 1; Flu(300+2×1) is a relative intensity of a fluorescence spectrum normalized so that its peak intensity becomes 1; and i is a variable that increases from 0 to 200 by 2 at a time.

2. The plastic wavelength shifting fiber according to claim 1, wherein the fluorescent agent is a coumarin-based compound.

3. The plastic wavelength shifting fiber according to claim 2, wherein the fluorescent agent is 3-aryl-7-dialkylamino-coumarin (in which an aryl group is an aromatic or heteroaromatic ring having a carbon number of 4 to 6, and a carbon number of an alkyl group substituted in an amino group is 1 to 4).

4. The plastic wavelength shifting fiber according to claim 1, wherein the fluorescent agent is a thiazole-based compound.

5. The plastic wavelength shifting fiber according to claim 4, wherein the fluorescent agent is 4-formyl-5-(4-dialkylaminophenyl) thiazole (in which a carbon number of an alkyl group substituted in an amino group is 1 to 4), or 4-(4-dialkylaminophenyl)-5-formylthiazole (in which a carbon number of an alkyl group substituted in an amino group is 1 to 4).

6. The plastic wavelength shifting fiber according to claim 1, wherein an outer diameter is 3.0 mm or smaller.

* * * * *